Dec. 24, 1957 J. E. CHARLET 2,817,303
JACKING EQUIPMENT FOR HIGHWAY TRAILER
TRANSPORTATION ON RAILROAD FLAT CARS
Filed April 25, 1955 3 Sheets-Sheet 1
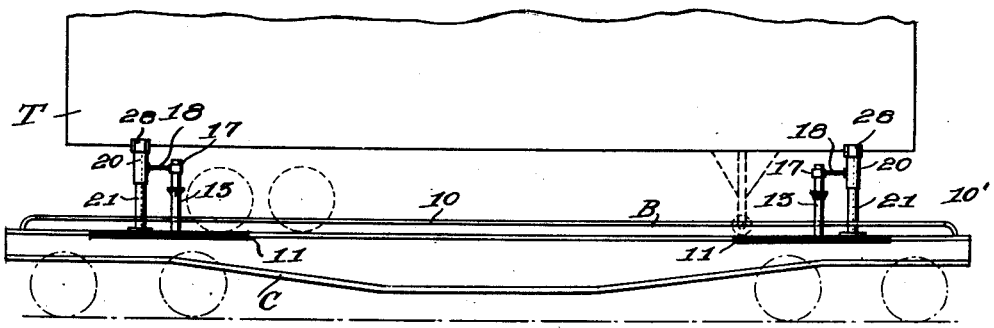
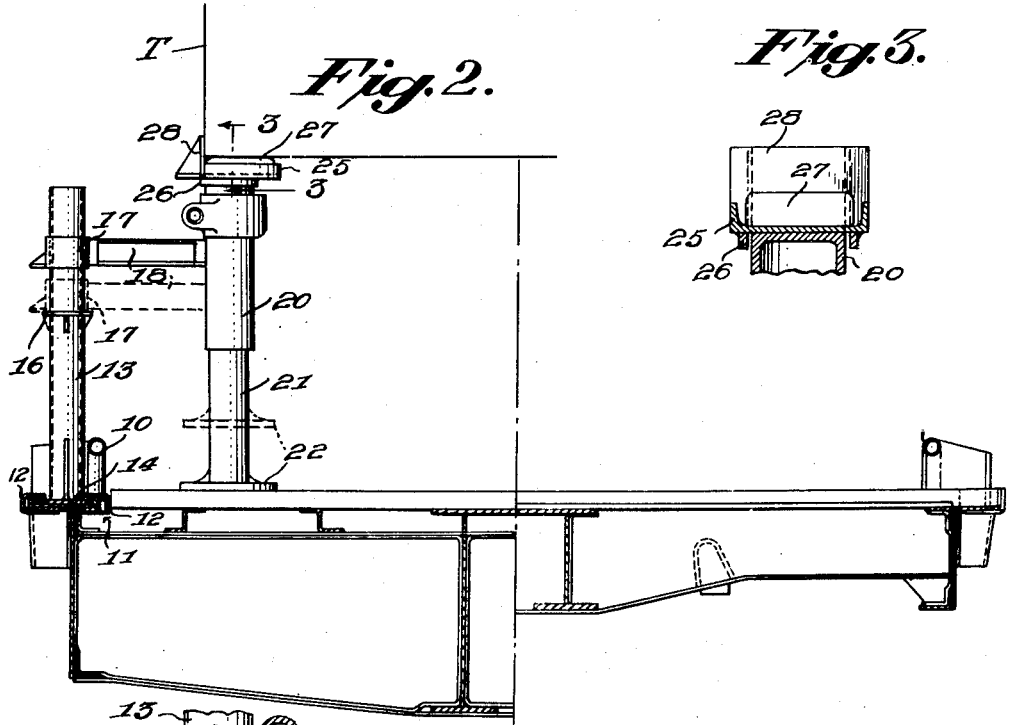
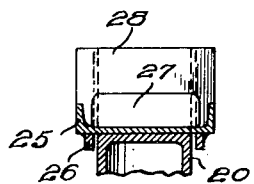
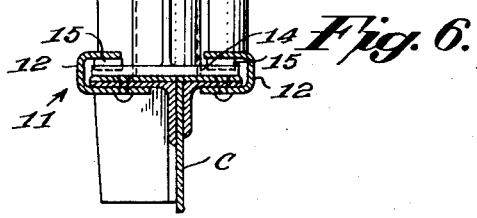
INVENTOR
Jean E. Charlet
BY George E. Cook
ATTORNEY

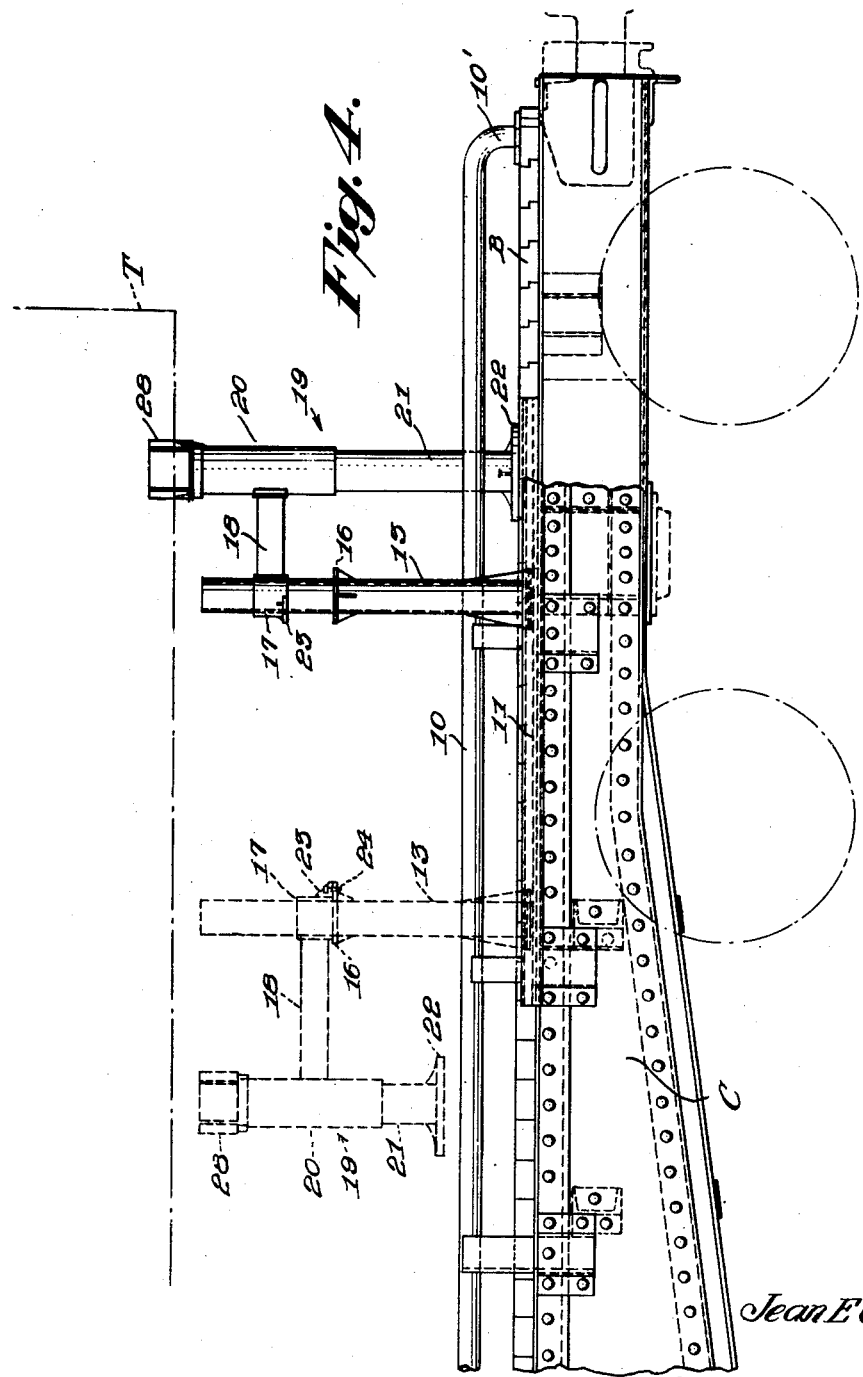

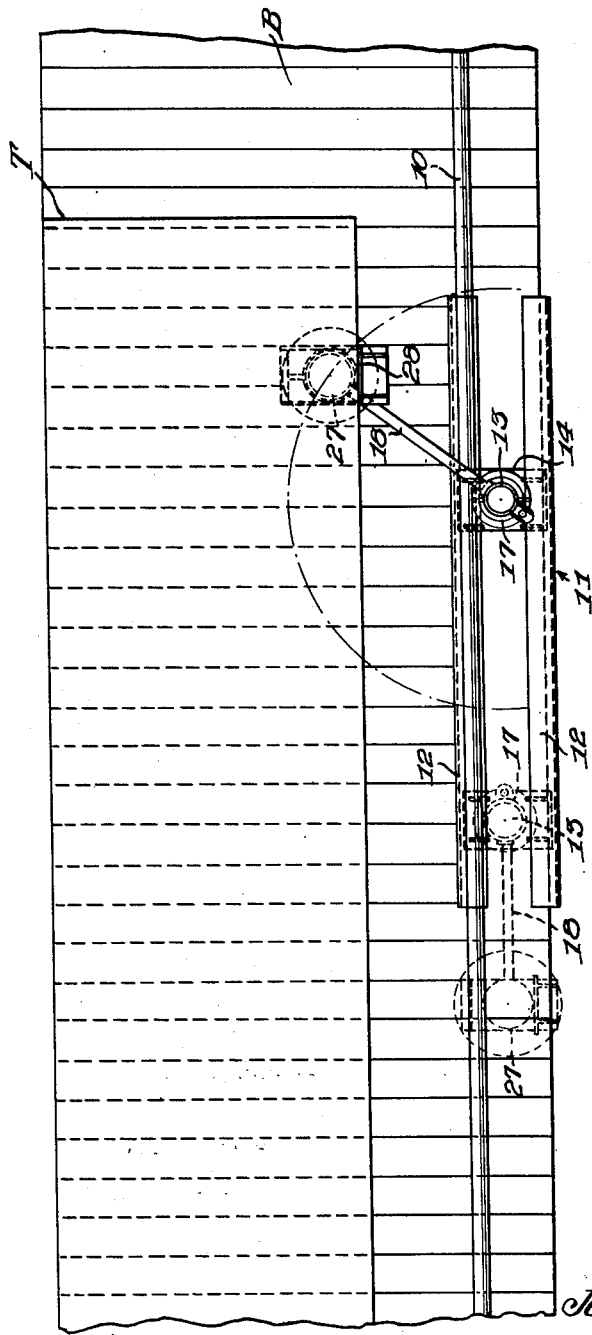

United States Patent Office …

2,817,303
Patented Dec. 24, 1957

2,817,303

JACKING EQUIPMENT FOR HIGHWAY TRAILER TRANSPORTATION ON RAILROAD FLAT CARS

Jean E. Charlet, Oakland, N. J., assignor to Magor Car Corporation, New York, N. Y., a corporation of Delaware Application April 25, 1955, Serial No. 503,715

2 Claims. (Cl. 105—368)

This invention relates to a railroad flat car construction for highway trailer transportation.

A primary feature of the invention is the provision of improved means on the bed or platform of a railroad flat car adapting it to use for blocking trailers on the car with a minimum of effort and time.

A further feature of the invention is the provision of trailer blocking means whereby trailers of variable widths and lengths may be elevated above the car bed and effectively blocked in position.

A still further feature of the invention is the provision of trailer blocking means as above referred to, which is of relatively simple construction, is durable in use, and is highly efficient in operation.

Other features and advantages of the invention will become apparent in the course of the following detailed description, taken in connection with the accompanying drawings, wherein—

Fig. 1 is a side elevational view of a railroad flat car provided with the blocking means in accordance with a preferred embodiment of the invention, and wherein a trailer is shown in blocked position on the car.

Fig. 2 is a broken transverse sectional view of the car body and showing one of the trailer blocking units in elevation.

Fig. 3 is an enlarged vertical sectional view as observed in the plane of line 3—3 on Fig. 2.

Fig. 4 is a side elevational view of one end of a railroad flat car and showing one of the blocking units in operative position in full lines and same unit being indicated in dotted lines as having been swung out of operative position and moved longitudinally of the car.

Fig. 5 is a top plan view of the structure shown in Fig. 4.

Fig. 6 is a fragmental enlarged sectional view of one of the unit track guides and showing a unit base slidably supported therein.

Referring now in detail to the drawings by use of reference characters, a railroad flat car is indicated as C and which in addition to the many usual parts thereof includes a flat bed or platform B on which trailers are to be blocked.

A guard rail 10 is disposed adjacent each side of the car bed B and same preferably comprises a tubular member which extends substantially throughout the length of the bed, the opposite ends of such member being downwardly curved as at 10' and suitably rigidly secured to the bed B.

The bed B is provided with four tracks 11, one adjacent each corner of the bed, or two at each side of the bed in transverse alignment with two at the opposite side of the bed. The tracks 11, as is more clearly indicated in Fig. 6, each include laterally spaced inwardly facing generally U-shaped flanges or channels 12.

A cylindrical post 13 is associated with each track 11 and same comprises a rectangular base plate 14 which is longitudinally slidable in the track, the opposite lateral edges thereof being confined within the said channels 12, as is clearly indicated in Fig. 6.

To overcome undue friction, the base plate 14 is preferably provided with rollers 15 engaging the upper inner walls of the channels 12.

The post 13 is provided with a stop 16 intermediate its upper and lower ends and a sleeve 17 is supported on the post above the stop 16 for axial movement and for rotation about the post.

The sleeve 17 is provided with an arm 18 whose outer end is rigidly secured to an upper cylindrical jack section 20 of a trailer elevating and blocking jack 19, which jack also includes a lower cylindrical section 21 having the upper end thereof telescoped within the lower end of the upper section 20 and the lower section 21 is provided with a car bed engaging base 22. The sleeve 17 is preferably provided with an apertured lug 23 and a locking pin 24 is releasably supported in the aperture in said lug and an aligned aperture in the stop 16 for holding arm 18 in an inoperative position.

The upper end of each upper jack section 20 is provided with an upwardly facing cup 25 from the base of which depends a ring 26 encircling the said upper jack section 20. A trailer engaging block 27 is supported within the cup 25 and to which cup is rigidly secured a trailer engageable back plate 28.

Having set forth the structure embodied in the invention, the operation thereof is as follows:

Assuming that the jack 20, 21 shown in trailer blocking position in Fig. 2 is to be rendered inoperative, upon operation of the jack to lower upper section 20, sleeve 17 and arm 18 will lower therewith. Upon engagement of sleeve 17 with stop 16, the section 20 will be arrested in its downward movement with a resulting upward movement of the lower section 21 until the base 22 thereof assumes the vertical position indicated in dotted lines and in which position the base is above the rail 10. Operation of the jack at this point ceases and the sleeve 17, arm 18 and jack 19 are rotated about the axis of post 13 to a position wherein the axes of the post and jack are substantially in a plane longitudinally bisecting the track 11, as is indicated in Figs. 4 and 5 and particularly at the left of the latter figure.

In this inoperative position the arm 18 is locked by means of the pin 24.

When a trailer is loaded and it is desired to proceed with its blocking, the four jack units are successively operated and considering one of such units, the pin 24 is withdrawn and the assembly including sleeve 17, arm 18 and jack 19 are swung about the axis of post 13 into position under the side of the trailer T.

Various angular ranges of the swinging movement adapt the units to locations suitable for various width trailers and since the trailer supporting block 27 with the cup 25 are rotatable about the axis of jack section 20, the back plate 28 may assume parallel relation with the side of the trailer regardless of the angular range of swinging movement of the unit.

The jack now being in position under the trailer, it is now operated to raise the trailer. In such operation, initially base 22 will move downwardly and continue until it engages the car bed B. From that instant on the upper jack section 20 will move upwardly with arm 18 and sleeve 17, and when the block 27 contacts the trailer and the latter is raised to the desired position, jack operation is ended and the jack locked in such position.

The jack units are movable longitudinally of the car bed B for adapting same for use with trailers of various lengths and such is readily effected by means of the slidable engagement of the post bases in the channels 12 of the tracks 11, Figs. 4 and 5 depicting such operation.

The jacks 19 disclosed are preferably of the screw type but may be of a worm gear type, hydraulic or pneumatic.

The structure above described is endowed with marked advantages, principal ones of which are: the jacks are unitary parts of the car C and which can be locked in out of the way position when not in use whereby same are not likely to be lost, as is the case with independent jacks. Furthermore, removal of the jacks from the car to clear the bed or platform for loading and unloading of trailers is not necessary, thereby resulting in time-saving during the loading and unloading operations.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. In combination with a railroad flat car having a horizontally disposed rectangular bed, a plurality of vertical cylindrical posts disposed adjacent each side of said bed in spaced relation longitudinally thereof and having their lower ends supported by the bed and having free upper ends, each of said posts being provided with a fixed stop intermediate the lower and upper ends thereof, a trailer elevating and blocking jack disposed in spaced parallel relation with each post and including upper and lower telescoping sections, a sleeve freely engaged with each post above the respective stop for rotation about the post and for movement axially thereof, an arm disposed radially on each sleeve at the corresponding upper jack section and having its opposite end rigidly secured thereto.

2. The structure according to claim 1 wherein said bed is provided with a longitudinal track for each of said posts, each of said tracks being of channel form and including upper inwardly directed flanges, each post being provided with a rectangular base plate slidably supported in a respective track, and said base plate being provided with rollers engaging the inner walls of said inwardly directed flanges.

References Cited in the file of this patent

UNITED STATES PATENTS

| | | |
|---|---|---|
| 2,099,288 | Allen | Nov. 16, 1937 |
| 2,128,667 | Atherton | Aug. 30, 1938 |